US010749765B2

(12) United States Patent
Barabash et al.

(10) Patent No.: US 10,749,765 B2
(45) Date of Patent: Aug. 18, 2020

(54) METHOD AND SYSTEM FOR MONITORING COMMUNICATION IN A NETWORK

(71) Applicant: International Business Machines Corporation, Armonk, NY (US)

(72) Inventors: Katherine Barabash, Haifa (IL); Dean Har'el Lorenz, Haifa (IL); Eran Raichstein, Yokneam Ilit (IL); Liran Schour, Kibutz Harduf (IL)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/242,016

(22) Filed: Jan. 8, 2019

(65) Prior Publication Data
US 2020/0220794 A1    Jul. 9, 2020

(51) Int. Cl.
*H04L 12/26* (2006.01)

(52) U.S. Cl.
CPC .......... *H04L 43/028* (2013.01); *H04L 43/022* (2013.01); *H04L 43/026* (2013.01); *H04L 43/04* (2013.01)

(58) Field of Classification Search
CPC ..... H04L 43/02; H04L 43/024; H04L 43/028; H04L 43/022; H04L 47/36
See application file for complete search history.

(56) References Cited

U.S. PATENT DOCUMENTS

| 7,065,482 | B2 | 6/2006 | Shorey et al. |
| 7,075,887 | B2 | 7/2006 | Love et al. |
| 7,130,268 | B2 | 10/2006 | Mascolo |
| 2008/0175249 | A1* | 7/2008 | Yi .......................... H04L 1/1841 370/394 |
| 2014/0286174 | A1* | 9/2014 | Iizuka ..................... H04L 43/12 370/241 |

(Continued)

FOREIGN PATENT DOCUMENTS

WO    2006058212    6/2006

OTHER PUBLICATIONS

Lee et al., "Packet Out-of-order and Retransmission in Statisticsbased Traffic Analysis", IEICE, 2014 (Year: 2014).*

(Continued)

*Primary Examiner* — Omer S Mian
(74) *Attorney, Agent, or Firm* — Ziv Glazberg

(57) ABSTRACT

A method, system and computer program product, the method comprising: in response to receiving a packet from a stream of packets transmitted to a computing platform, determining, based on a meta-data of the packet, whether to capture the packet or avoid capturing thereof, said determining comprising: subject to the meta-data indicating that a sequence number of the packet is within a first range or within a second range, wherein a distance between an end of the first range and a beginning of the second range is at least of a predetermined size, wherein a distance, through a wraparound, between an end of the second range and a beginning of the first range is at least of the predetermined size, thereby a wraparound situation is identifiable within the stream of packets; and in response to determining to capture the packet: capturing the packet; and transmitting the packet to analysis.

20 Claims, 4 Drawing Sheets

(56) References Cited

U.S. PATENT DOCUMENTS

2015/0296468 A1* 10/2015 Dural .................. H04W 56/003
370/336
2017/0367017 A9* 12/2017 Meylan ................. H04L 1/1841
2019/0044878 A1* 2/2019 Steffen .................... H04L 47/34

OTHER PUBLICATIONS

Vanit-Anunchai et al. "Effect of Sequence Number Wrap on DCCP Connection Establishment", IEEE, 2006 (Year: 2006).*
Nick Duffield et al., "Properties and Prediction of Flow Statistics from Sampled Packet Streams", Proceedings of the 2nd ACM SIGCOMM Workshop on Internet measurment, 2002, pp. 159-171.
Qi (George) Zhao et al., "Data Streaming Algorithms for Accurate and Efficient Measurement of Traffic and Flow Matrices", Proceedings of the 2005 ACM SIGMETRICS international conference on Measurement and modeling of computer systems, 2005, pp. 350-361.

* cited by examiner

METHOD AND SYSTEM FOR MONITORING COMMUNICATION IN A NETWORK

TECHNICAL FIELD

The present disclosure relates to monitoring networks in general, and to a method and apparatus for estimating flow parameters in communication networks, in particular.

BACKGROUND

In all types of monitoring, and communication network monitoring is no exception, a tradeoff exists between the monitoring cost in money, time, memory or other resources, and the effectivity of the collected data, e.g., how accurate or useful the collected data is. Higher sampling rate, sampling more information or the like generally provides for more accurate estimation and more useful data, but require additional s resources.

In particular, in networks, monitoring interfaces and/or switch-port level is typically statistical in nature and may thus be very resource efficient, but is not fully accurate. On the other hand, software packet level capturing solutions are highly informative but very demanding and create significant system overhead.

Overheads are generally of three types: CPU, storage, and networking. CPU overhead relates to the amount of CPU required to operate the monitoring system. Storage overhead relates to the amount of storage required to retain the collected information until it is analyzed and deleted. Networking overhead is the amount of network traffic used for the monitoring itself. The overheads themselves may affect the communication flow within the network, by reducing the effective bandwidth and/or increasing latency. As a result, the monitored network behaves differently when it is being monitored as opposed to its normal operation. So, the monitored data may not provide insight into the operation of the network in a non-monitored state.

Monitoring each packet is expensive in CPU resources, storage resources and networking resources. Thus, without, it is impractical without assistance from hardware resources. Statistical monitoring, however, is less informative and may not be accurate enough, therefore it is also of limited practicality for purposes such as network level troubleshooting.

BRIEF SUMMARY

One exemplary embodiment of the disclosed subject matter is a computer-implemented method comprising: in response to receiving a packet from a stream of packets transmitted to a computing platform, determining, based on a meta-data of the packet, whether to capture the packet or avoid capturing thereof, said determining comprising: subject to the meta-data indicating that a sequence number of the packet is within a first range or within a second range, wherein a distance between an end of the first range and a beginning of the second range is at least of a predetermined size, wherein a distance, through a wraparound, between an end of the second range and a beginning of the first range is at least of the predetermined size, thereby a wraparound situation is identifiable within the stream of packets; and in response to determining to capture the packet: capturing the packet; and transmitting the packet to analysis. Within the method, said determining is optionally performed in a stateless manner. The method can further comprise analyzing the packet to determine a flow-level parameter of a session. Within the method, the flow level parameter is optionally selected from the group consisting of: a volume transmitted during a session; a duration of the session; and an average bandwidth during the session. Within the method, optionally determining to capture the packet in response to the meta-data indicating that the packet is a synchronization (SYN) Transmission Control Protocol (TCP) packet, a reset (RST) TCP packet or a finish (FIN) TCP packet. Within the method, said determining is optionally performed in a kernel space of the computing platform, and analysis of the packet is performed in a user space of the computing platform. Within the method, a Berkeley Packet Filter (BPF) is optionally utilized to determine if the meta-data indicates that the sequence number is within the first range or within the second range. Within the method, the BPF is optionally utilized to further determine if the meta-data indicates the packet is a beginning packet of a session or an ending packet of a session. Within the method, each of the first range and the second range are optionally at least of size equal to a maximal packet size. Within the method, each of the first range and the second range is optionally of a size being at least a TCP window size. The method can further comprise transmitting the packet to analysis in response to the meta-data indicating that the packet is not a TCP packet. Within the method, said stream of packets is optionally examined until a stopping condition is determined, the stopping condition is selected from the group consisting of: a predetermined period of time has elapsed; a predetermined number of packets has been captured; a predetermined number of TCP packets has been captured; a predetermined number of TCP sessions has been initialized or terminated; and a predetermined number of wraparounds has been observed.

Another exemplary embodiment of the disclosed subject matter is a system having a processor, the processor being adapted to perform the steps of: in response to receiving a packet from a stream of packets transmitted to a computing platform, determining, based on a meta-data of the packet, whether to capture the packet or avoid capturing thereof, said determining comprising: subject to the meta-data indicating that a sequence number of the packet is within a first range or within a second range, wherein a distance between an end of the first range and a beginning of the second range is at least of a predetermined size, wherein a distance, through a wraparound, between an end of the second range and a beginning of the first range is at least of the predetermined size, thereby a wraparound situation is identifiable within the stream of packets; and in response to determining to capture the packet: capturing the packet; and transmitting the packet to analysis. Within the system, said determining is optionally performed in a stateless manner Within the system, the packet is optionally analyzed to determine a flow-level parameter of a session, selected from the group consisting of: a volume transmitted during a session; a duration of the session; and an average bandwidth during the session. Within the system the processor optionally determines to capture the packet in response to the meta-data indicating that the packet is a synchronization (SYN) TCP packet, a reset (RST) TCP packet, a finish (FIN) TCP packet, or not a TCP packet. Within the system, a Berkeley Packet Filter (BPF) is optionally utilized to determine if the meta-data indicates that the sequence number is within the first range or within the second range, and wherein the BPF is utilized to further determine if the meta-data indicates the packet is a beginning packet of a session or an ending packet of a session. Within the system, each of the first range and the second range are optionally at least of size being at least a Transmission Control Protocol (TCP) window size. Within the system, said stream of packets is optionally examined until a stopping condition is determined, the stopping condition is selected from the group consisting of: a predetermined period of time has elapsed; a predetermined number of packets has been captured; a predetermined number of TCP packets has been captured; a predetermined number of TCP sessions has been initialized or terminated; and a predetermined number of wraparounds has been observed.

Yet another exemplary embodiment of the disclosed subject matter is a computer program product comprising a non-transitory computer readable medium retaining program instructions, which instructions when read by a processor, cause the processor to perform a method comprising: in response to receiving a packet from a stream of packets transmitted to a computing platform, determining, based on a meta-data of the packet, whether to capture the packet or avoid capturing thereof, said determining comprising: subject to the meta-data indicating that a sequence number of the packet is within a first range or within a second range, wherein a distance between an end of the first range and a beginning of the second range is at least of a predetermined size, wherein a distance, through a wraparound, between an end of the second range and a beginning of the first range is at least of the predetermined size, thereby a wraparound situation is identifiable within the stream of packets; and in response to determining to capture the packet: capturing the packet; and transmitting the packet to analysis.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
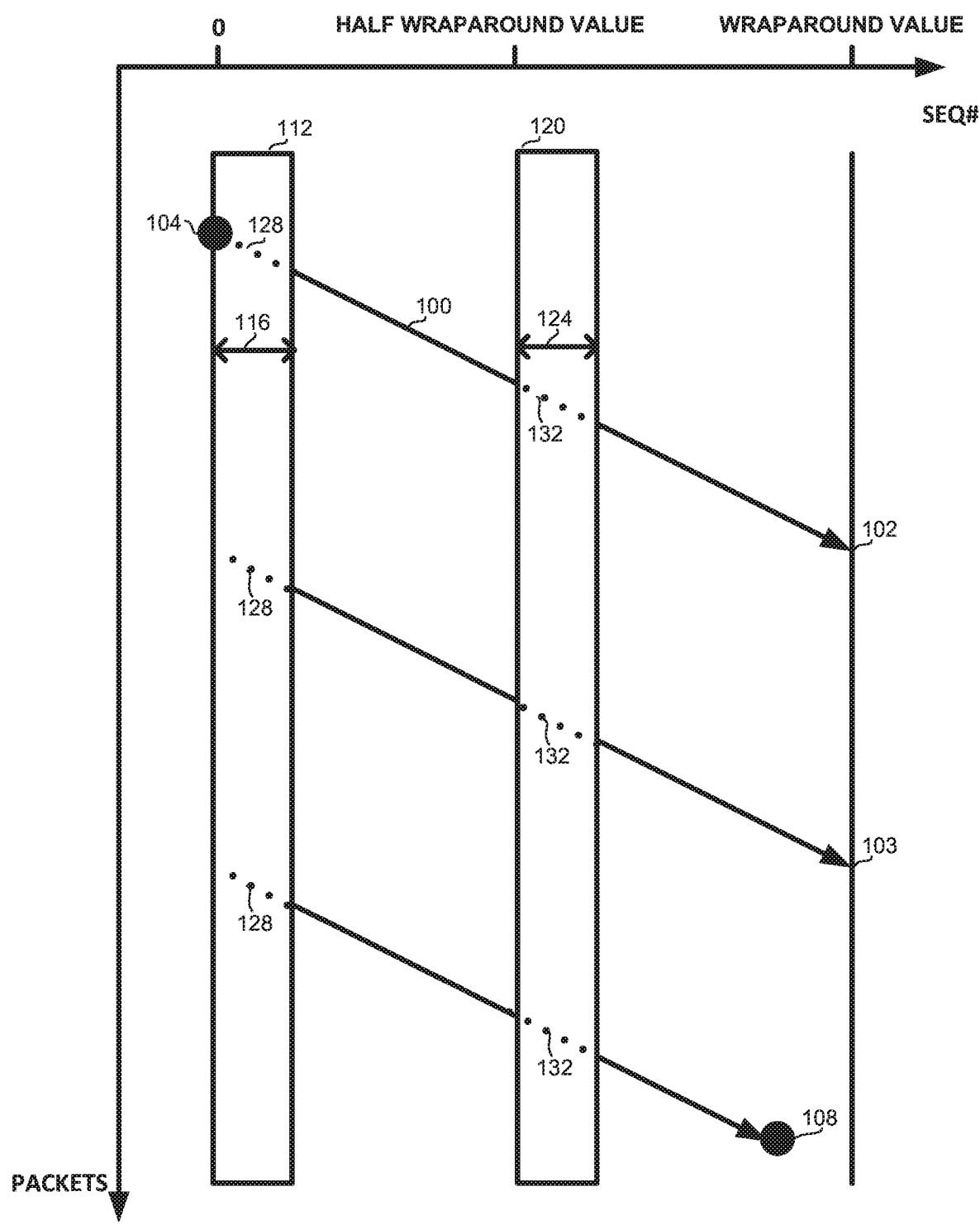
FIG. 1 shows a schematic exemplary illustration of electively capturing sample packets from a session, in accordance with some exemplary embodiments of the disclosed subject matter.

Unlike monitoring interfaces and/or switch-port level statistics on one hand, and software packet level on the other hand, flow level network monitoring may provide a desired balance between the resources required for monitoring, and the efficiency and accuracy of the monitoring outputs.

Network flow monitoring, also referred to as network traffic analysis, bandwidth utilization analysis or bandwidth monitoring, may provide a level of visibility into the volume and rate of the data transmission, which is useful for effective network and infrastructure management. The flow relates to a series of communications between two end points, wherein the communications are per session, e.g. bounded by the opening and closing of a session. Network flow monitoring often provides important data for resolving intermittent network performance problems and ensuring Quality of Service (QoS) for key applications and services.

Flow level network monitoring may thus be useful in increasing the visibility and thus the manageability of modern communication networks and interconnected applications served by the networks. Obtaining the per-flow statistics information enables correct attribution of flows to applications or users for better problem determination and solving, billing, and providing quality of experience. There are several currently known methods for obtaining these statistics.

One type of solutions to flow level monitoring includes hardware assisted systems collecting all the network packets traversing certain network devices/ports, and sending them to an analytic unit capable of computing any required metrics, including per-flow statistics such as flow duration and bandwidth. Such systems tend to incur high costs and low flexibility.

On the other extreme, counters capable of aggregating bulk statistics such as total bytes flowing in and out of an interface provide low cost sampling-based methods. These systems often suffer from low accuracy of the obtained information, and their statistics quality depends on the capabilities of the analyzing unit. While some systems employ more advanced algorithms to improve such estimations, these systems are still more suitable for bulk estimations required for system-wide optimizations and are less suitable for fine grained tasks such as application level problem determination, debugging, or visualization.

Thus, one technical problem dealt with by the disclosed subject matter is a need to perform flow level monitoring of a network, in an efficient yet effective manner, which may provide substantial amount of information while requiring insignificant CPU and networking resources, in order not to affect the network operation.

It may be desired to provide such a solution without requiring the use of a specific hardware unit to be deployed at each monitored node. A software-based solution may be useful and may be easily deployable over distant nodes without requiring gaining physical access thereto.

Each packet transmitted in a network comprises meta data, which for some packets comprise a sequence number of the packet within a session. The term wraparound relates to a situation in which the sequence number of a packet exceeds the boundary of the part of the packet in which it is stored, and is thus reset, to start a new round. Therefore, given two packets wherein the second packet contains payload which is later within the data transmitted during the session than the payload of the first packet, a wraparound may occur between the two packets, such that the second packet may have a lower sequence number than the sequence number of the first packet. However, a lower sequence number may also be the result of inspecting packets out of order, or retransmission, in which a packet is retransmitted in response to a problem with the initial transmission or receiving of the packet.

Thus, another technical problem dealt with by the disclosed subject matter relates to tracking the packet sequence numbers correctly, including identifying wraparound situations and differentiating these situations from retransmissions. In some embodiments, the disclosed subject matter may track Transmission Control Protocol (TCP) sessions, identify wraparound situations correctly and avoid being misguided due to retransmission.

One technical solution comprises efficiently and accurately obtaining flow statistics, based on observing network traffic as it traverses the operating system's TCP/IP stack, capturing a small subset of packets for each monitored session. For example, packets may be captured within two ranges of sequence numbers, thus sampling every wraparound cycle, and computing flow level statistics, from data available in the TCP headers of the captured packets.

The two windows may be widely separated over the sequence number space, also referred to as wraparound size, for example one may be at or near the beginning of the space and the other at or near its half, such that the difference therebetween is significantly larger than the width of either one. Thus, since re-transmission is limited to a predetermined packet size, a sequence number of a captured packet which is smaller than a sequence number of a preceding captured packet necessarily implies a wraparound. In other words, a second packet captured later than a first packet is guaranteed to have been sent later than the first packet. On the other hand, having at least two windows ensures that a wraparound cannot go unnoticed. This arrangement provides for exact count of the number of wraparounds in a session, which when added to the number of packets between the first and last packets as detailed below (which does not take into account the wraparounds), provides the exact volume transmitted during the session. In some exemplary embodiments, the two windows may be defined so as to have a similar number of packets received after the first window and before reaching the second window, as the number of packets received after the second window and before reaching the first window (after a wraparound situation). Positioning one window at about the beginning of the space and the other at about the middle thereof, may provide such a desired configuration.

In some cases, the sizes and positioning of the windows may be designed with the knowledge of the specific communication protocol which is being analyzed. For example, the size of the window may be set to be at least as large as the largest possible packet, e.g., larger than the maximal possible distance between two consecutive packets, so as to avoid jumping over the windows by a jumbo packet and ensuring that a packet is captured. As another example, the distance between the windows may be designed to be larger than a window size in which retransmission is possible.

Packet capturing may begin after a session start packet, e.g. a synchronization (SYN) packet in TCP has been encountered, and terminated when a session end packet, e.g. a reset (RST) packet or a finish (FIN) packet in TCP have been encountered.

Another technical solution comprises handling only packets of a particular type, for example Transmission Control Protocol (TCP) packets. Thus, TCP packets captured during session, and whose sequence number is within one of the two windows will be analyzed. Other TCP packets (that are not session start or end packets) may go unmonitored and unanalyzed. Packets associated with other protocols, which usually make up a much smaller part of the transmitted volume, may be handled unconditionally, may go unhandled unconditionally, or may also be handled in accordance with a scheme similar to the TCP handling mechanism.

Yet another technical solution comprises determining whether packets are to be captured for analysis or not. The determination may be performed in an efficient and stateless manner, which considers only the incoming or outgoing packet and no factors related for example to the session or to the monitored system. For example, the determination may be performed in the kernel space. Screening the packets within the kernel space may provide for fast and efficient checking, as the screening is performed without requiring the transfer of data from the kernel space to the user space. Also, since only few packets, for example two 64K (65536 bytes) units are captured out of each wraparound volume which may be of 4G, and only the headers thereof are transmitted for analysis, this requires relatively very little resources. The more intense analysis, however, which provides more information, may be done independently of the capturing, for example in user space, by a different computing platform, at a later time after the transfer, or the like.

One technical effect of the disclosure is the provisioning of an efficient and effective method and system for monitoring network communication, and in particular flow level monitoring. The collected data provides for obtaining significant information for monitoring the network and solving problems, with negligible CPU, storage and networking overheads. The disclosed method and apparatus provides for robust estimation of the amount of data transmitted during a session, which may be combined with time information, regardless of possible retransmissions occurring during the session.

Another technical effect of the disclosure is the provisioning of a method and apparatus for selectively capturing and analyzing only certain packets of certain type(s) or protocol(s), such that collecting the information does not incur significant overhead. Packets of other types may be fully or partially captured and analyzed, or fully ignored. This is as opposed to the conventional configuration in which packets of different protocols are handled uniformly.

Yet another technical effect of the disclosed subject matter is performing flow-level monitoring on-the-fly, as opposed to offline analysis. Naïve solutions would capture all packets to be used in a later, offline analysis. The disclosed subject matter, in contrast, enables a stateless and efficient online decision-making of whether packets are to be captured, resulting in a reduced overhead, which packets to capture and use for analysis and which packets to drop. The disclosed online decision-making may result in a substantial majority of the packets not being analyzed, and hence a substantial reduction in overhead in comparison to other naïve solutions.

It is further noted that not only is there a reduction in overhead, analysis may be performed on-the-fly and based on partial information, to provide real-time analysis prior to the completion of the data stream. For example, if one relies only on beginning and ending packets, until the ending packet is received, there is no estimation as to the duration of the session and no estimation as to the total amount of data that would be transferred. By tracking wraparound situations, analysis may be performed iteratively, and only provide indications as to bandwidth before the session ends. It will be appreciated, however, that the analysis can be performed at a later time and not necessarily immediately following the capturing.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a schematic exemplary illustration of selectively capturing packets from a session, in accordance with some exemplary embodiments of the disclosed subject matter.

FIG. 1 shows advancement 100 of the sequence numbers in packets, such as TCP packets received during a session. It will be appreciated that although line 100 is shown as a straight line, the sequence numbers are discrete. Even further, the sequence numbers generally advance in hops larger than 1. For example, the sequence numbers may be advanced by the size of the packet so after sending packets 10000 of size 64, the next packet may have the sequence number of 10065. The sequence numbers advance, until the wraparound value is reached, meaning that the accumulated number of the transmitted bytes since the beginning of the session or since a previous wraparound, has exceeded the capacity of the sequence number indicator in the meta data of the packet. Once this number has been reached, the sequence number is reset and starts advancing from 0 (or another value) again. In general terms, the sequence number of the new packet may be $SEQ_n=(SEQ_{n-1}+Size_{n-1})$ mod MAXSEQ, where $SEQ_i$ is the sequence number of packet i, $Size_i$ is the size of packet i, and MAXSEQ is the maximal possible sequence number in the space, also referred to as the wraparound value. FIG. 1 shows a session with two wraparounds, 102 and 103.

FIG. 1 illustrates a session beginning at a Beginning Packet 104 (e.g., SYN packet) having some initial value. The initial value is indicated in the SYN packet and may thus be any number, depending on the details of the communication protocol. For simplicity, FIG. 1 shows an initial value of 0. The session may end at an Ending Packet 108, such as FIN or RST packets. Packets in between may comprise the data stream. The disclosed subject matter may enable analysis of the Beginning Packet 104, Ending Packet 108 and packets in Ranges 112, 120. The analyzed packets may be used for flow-level monitoring, while avoiding analysis of most of the packets in the session.

During a session, packets for which the sequence number is within any of two sequence number ranges, hereinafter First Range 112 and Second Range 120, are captured. In the exemplary illustration, Range 112 is at the beginning of the packet number range, for example between 0x0 and 0x10000, and Range 120 is halfway through the maximal packet number, for example between 0x80000000 and 0x80010000, wherein the sequence number is of 32 bit, thus representing numbers up to the wraparound value of 0xffffffff. Thus, Packets 128 having sequence numbers close (in this example at most 0x10000 bytes away) to the beginning of each "round" are captured by first Range 112, and Packets 132 having sequence numbers close to the middle of each "round" (also at most 0x10000 bytes away in this example) are captured by Second Range 120.

First Range 112 and Second Range 120 are widely separated from each other, for example by a distance equal to half the maximal sequence number minus the range size, which may be $(2^{32}-1)-65536$. By selecting a difference which is at least as large as a retransmission window it is ensured that if a retransmission occurs after the Second Range 120 was reached, the retransmission will not be captured in the First Range 112.

This allows for correctly identifying wraparound situations, and not mistaking retransmissions in which a following packet has a smaller sequence number than a preceding packet, to be a wraparound situation. For example, in TCP, the window size may be referred to as TCP window size and may be 64 Kb. Additionally or alternatively, selecting a significant difference, such as over about 40%, 45%, 48%, or the like of the total space of the packet sequences, also allows for capturing a negligible number of the transmitted packets, thus inducing low CPU, storage and network overheads.

The sizes of First Range 112 and Second Range 120, denoted as 116 and 124, respectively, may be at least as large as the largest practical chunks transferred over the communication protocol, also known as the jumbo packet, for example 9K in TCP. This selection may ensure that the range is never skipped by a single large packet. Additionally or alternatively, the size of the range may be at least as large as a retransmission window, thereby ensuring that at least one packet in the range is acknowledged before the packets continue after the range. For example, one embodiment may be designed to have a size of 64 Kb with respect to TCP, due to a TCP window size of 64K. Although the maximal TCP packet size is 9K, some communication devices may aggregate packets, which can lead to packets of up to 64 Kb, which is the maximal number that can be coded in the packet header.

Figure 2A:
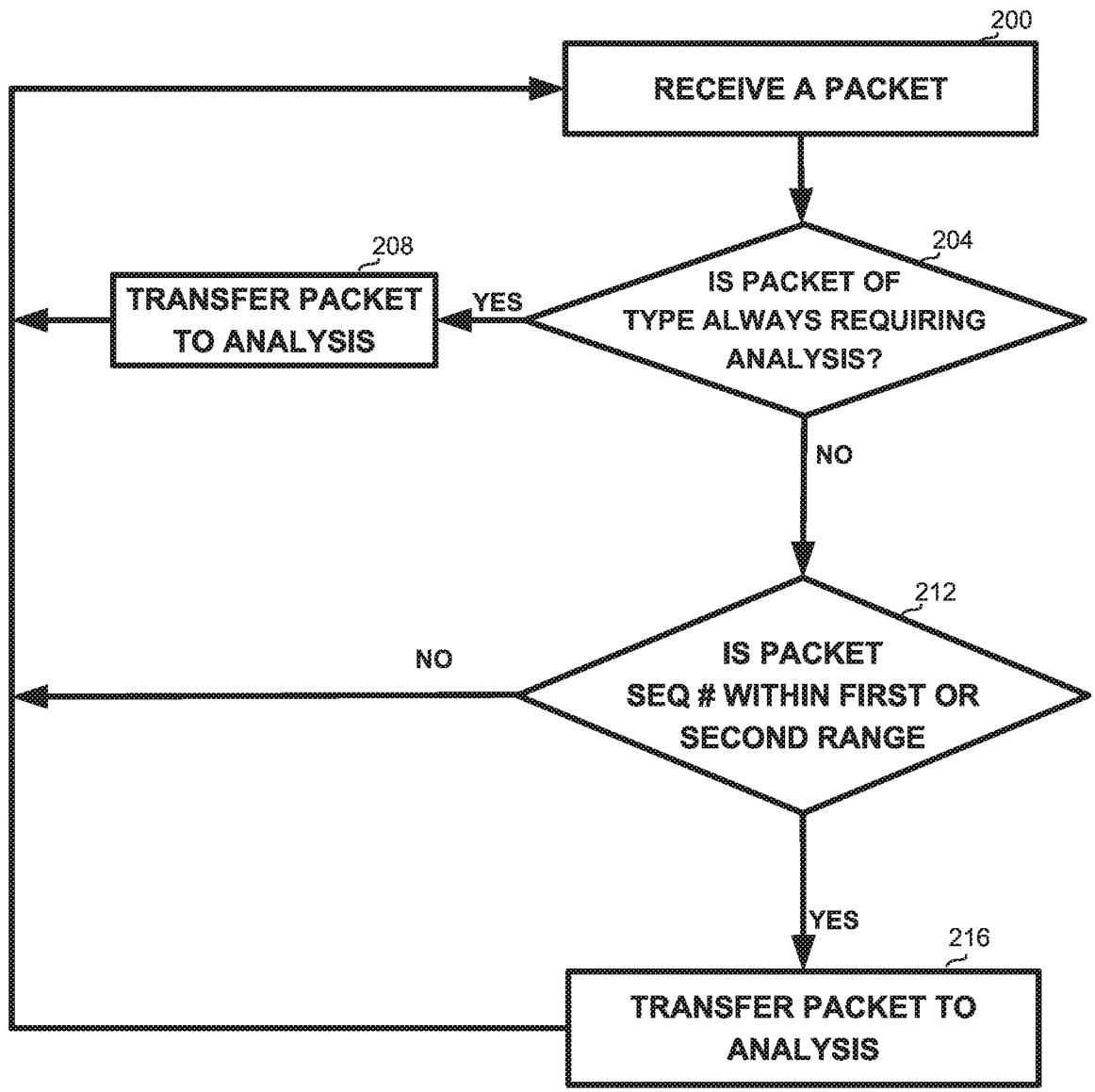
FIG. 2A shows a flowchart diagram of a method of monitoring communications in a network, in accordance with some embodiments of the disclosure.

Referring now to FIG. 2A, showing a method for monitoring communications in a network, in accordance with some embodiments of the disclosure.

In an exemplary embodiment, the method may be implemented with an operating system (OS) packet filtering mechanism, such as Berkeley Packet Filter (BFP) for LINUX™ operating system. The filtering mechanism may examine the metadata, e.g., the header of a packet, and determine whether the packet should be captured or not. In some exemplary embodiments, the filtering mechanism may be applied in the kernel space, based on filters that are dynamically defined in the user space. Such embodiment may provide for an efficient filtering mechanism which may filter most of the packets at kernel space. Only a minority of the packets are to be analyzed and are thus transferred to user space. This may achieve a reduced overhead and reduced resource requirements.

On Step 200, a packet may be received for examination by the filtering mechanism.

On Step 204, the filtering mechanism may examine the packet to determine its type, and in particular whether it is a type for which all packets require analysis. For example, all non-TCP packets, and all TCP packets of type SYN, FIN or RST may be captured and their headers transferred to analysis.

If the packet has not been captured, for example if it is of TCP type and not a SYN, FIN or RST packet, then on Step 212 the filtering mechanism may determine whether the packet should be captured, e.g. whether the sequence number of the packet is within either of the first range or the second range.

It is noted that for efficiency purposes, the determination of whether the packet is relevant to define a beginning or end of a session (e.g., checking if the packet is of type SYN, RST, or FIN in TCP) and the determination of whether the sequence number is within the first range or within the second range, can be performed by a single unified check of flags and values in the header of the packet. Using a single check may reduce computation overhead. For example, the check may be performed as follows: only packets for which the following condition holds may be transferred to analysis: (tcp[tcpflags] & (tcp-syn|tcp-fin|tcp-rst) !=0) or (tcp[4:4] <0x10000) or (tcp[4:4]>0x80000000 and tcp[4:4] <0x80010000), wherein tcp is the metadata of the packet, provided in a form of a bit array, tcpflags is one or more bits that are turned on if and only if the packet is a tcp packet and indicate its type, tcp-syn is a constant bitmask turned on for SYN packets, tcp-fin is a constant bitmask turned on for FIN packets, tcp-rst is a constant bitmask turned on for RST packets. Hence, the sub-expression (tcp[tcpflags] & (tcp-syn|tcp-fin|tcp-rst) !=0) is true if and only if the packet is SYN, FIN or RST. tcp[4:4] indicates the location where the sequence number is retained (4th byte in the header) and its size (4 bytes). The first condition on the sequence number—(tcp[4:4]<0x10000) checks if the sequence number is in the first range (e.g., between 0x0 and 0x10000), while the second condition on the sequence number—(tcp[4:4] >0x80000000 and tcp[4:4]<0x80010000) checks if the sequence number is in the second range (e.g., between 0x80000000 and 0x80010000).

In the above-referenced example, the size of each range is 64 Kb. The first range is between 0-64 KB, the second range is between 2 GB and 2 GB+64 KB. The number of sequence number is limited by the maximal value of 4 GB (e.g., TCP wraparound size). As can be appreciated, a very negligible minority of the packets would be analyzed and most would go unanalyzed. In fact, out of the space of 4 GB of sequence numbers only 128 KB are analyzed.

The portion of the analyzed packets is thus about 128 KB/4 GB=$3.2 \times 10^{-5}$, i.e., about 0.0032% of the packets excluding SYN/FIN/RST packets which are all inspected. However, only the packet headers are transferred to analysis. If the packet should indeed be transferred to analysis, then on Step 216, the packet may be transferred to analysis, wherein the analysis may be performed in the user space, in another computing platform, or the like. It will be appreciated that additional information may also be provided with the packet, such as timestamp, session identifying details, or the like.

The method may then continue on Step 200 with further received packets.

FIG. 2A thus demonstrates that capturing is stateless, i.e. does not depend on any condition state other than what is indicated by the packet itself. Further, determining, capturing and transmission are highly efficient, as determining is fast and only a small fraction of the stream is captured and transmitted for analysis. Analysis is also independent of the determination and transmission and can be performed at any time, or by any computing platform.

The packets as received may be analyzed to obtain valuable information such as flow level information, bandwidth, or the like. For example, the 'sequence number' field of the packet header data, such as TCP header data, may be aggregated per flow (or per session) to obtain flow level statistics. In some cases, the information may be used to determine session overall time, overall transferred data throughout the session, bandwidth utilized, or the like.

Figure 2B:
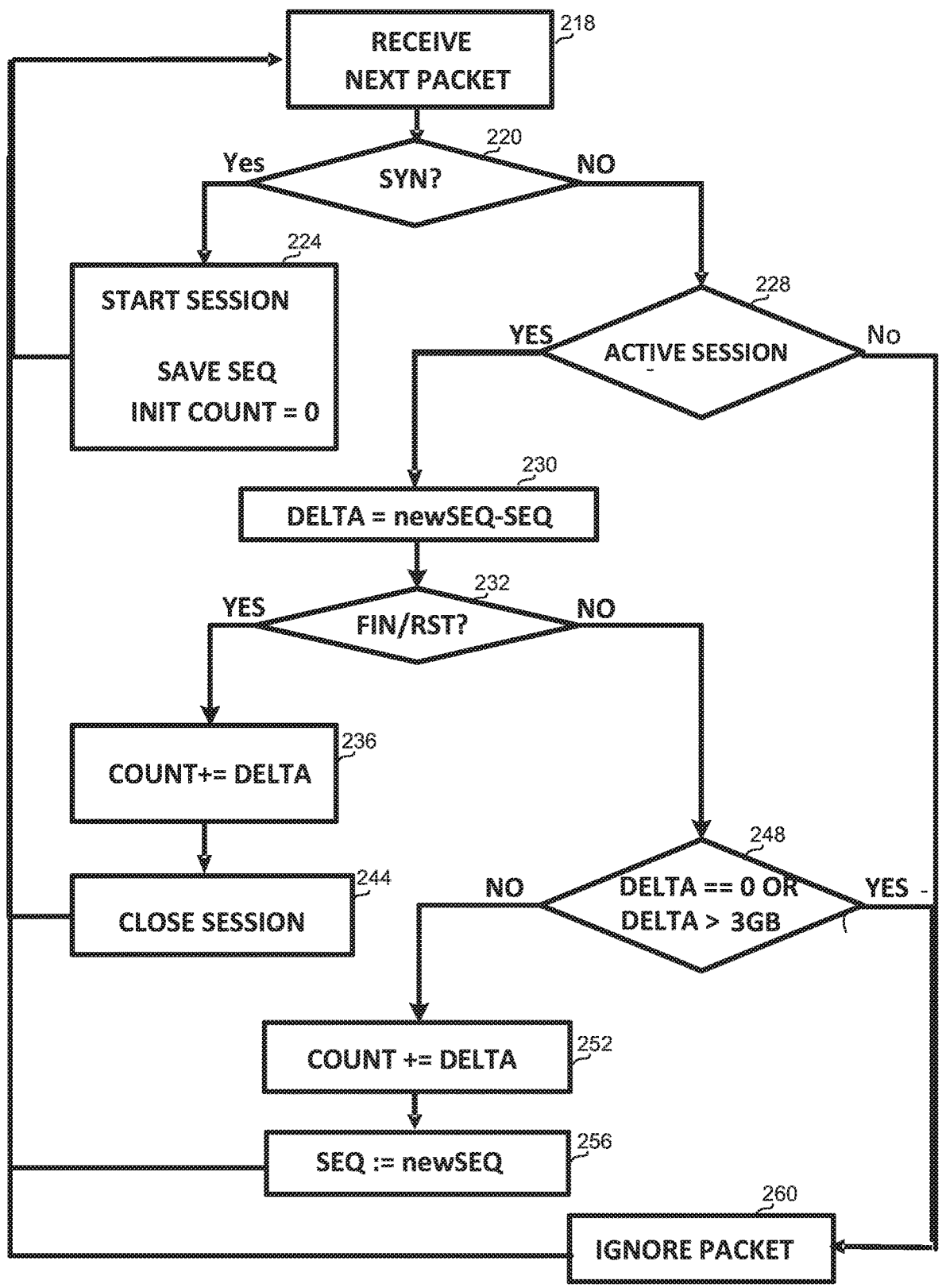
FIG. 2B shows a flowchart diagram of a method of determining whether a session is in process and transferring packets, in accordance with some embodiments of the disclosure.

Referring now to FIG. 2B, showing an exemplary method for analyzing the packets and obtaining data about the session.

On Step 218, a packet captured as detailed in FIG. 2A above may be received for analysis.

On Step 220, it may be determined whether the packet is a SYN packet, indicating the beginning of a session.

If the packet is a SYN packet, then on Step 224, a session may be initialized, including storing the sequence number in a variable, referred to herein as SEQ, and initializing a variable indicating the session size, referred to herein as Count.

If the packet is not a SYN packet, then on Step 228, it may be determined whether an active session is in process.

If no session is in process, then on Step 260 the packet may be ignored and execution may return to Step 218 for receiving a new packet.

If a session is in process, then on Step 230, a Delta, i.e. a difference is calculated between newSEQ being the sequence number of the current packet, and the stored value of SEQ. The sequence number is stored in a 32 bit integer, thus its maximal size after which a wraparound occurs is $2^{32}$. Therefore, Delta, being newSEQ-SEQ is calculated using $2^{32}$ arithmetic, as detailed below.

On Step 232, it may be determined whether the packet is a FIN or RST packet, indicating an end of a session, or not If the packet is a FIN or RST packet, then this cannot be a retransmission event, on Step 236 Count is updated by adding Delta calculated on Step 230, and on Step 244 the session is closed, and execution may return to step 218 of receiving another packet.

If the packet is not a FIN or RST packet, then on Step 248 it is determined whether Delta holds one of the following conditions: equal to zero, or larger than a predetermined value such as 3 GB as detailed below, or not.

If one of the conditions holds, then this is a retransmission situation, and on Step 260 the packet may be ignored If none of the conditions holds, then on Step 252 Count is updated by adding Delta calculated on Step 230, and on Step 256 SEQ is assigned the value of new SEQ, and execution may return to Step 218 for receiving a new packet.

When a session is closed, for example on Step 244, the Count variable holds the session size. Then further analyses may be performed, and in particular flow analyses, which may take into account also packet time stamps, the total session duration, or the like.

The $2^{32}$ arithmetic, and the conditions of Step 248 relate to a retransmission situation. The situation can be defined as follows: when the SEQ variable has a value of A and the sequence number of a current packet, referred to as newSEQ has a value of B, there are two possible cases: 1. If new bytes were sent, B>A. 2. A retransmission has occurred, due for example to a problem in previous transmission, then B≤A. However, due to wraparounds, modulus arithmetic needs to be used, resulting in B-A always being positive, such that it is unclear whether B>A or B≤A. However, in retransmission situations, B can never be smaller than A in more than the maximal window size in which retransmission can occur, being for example about 1G in TCP. Thus, in $2^{32}$ bit (4 GB) arithmetic: −1 GB=4 GB−1 GB=3 GB. It is also known, due to the positioning of the captured windows within the wraparound cycle that if B is a packet captured in the second range, it cannot be more than 2 GB+64 KB larger than A.

Thus, if (B−A)>3 GB or (B−A)==0 it is a retransmission situation and if 0<(B−A)<2 GB+64 KB it is a later packet and COUNT should be updated Since packets are captured only within a 64K range, if a retransmission is captured it must be within this range.

Thus, for captured retransmissions (B−A)>−64K=4 GB−64K, which can only occur if A was at the latest edge of the range. Other delta values (i.e., 2 GB+64K<(B−A)<4 GB-64k) are not expected to occur and indicate an error.

It will be appreciated that the flowcharts of FIG. 2B may be extended to analyzing multiple sessions, based on session information available in the received packets.

It will be appreciated that the flowcharts of FIGS. 2A and 2B are exemplary only, and that different steps, or steps taken at different order can be used for determining whether packets are to be transferred for analysis, and how the packets are analyzed.

Figure 3:
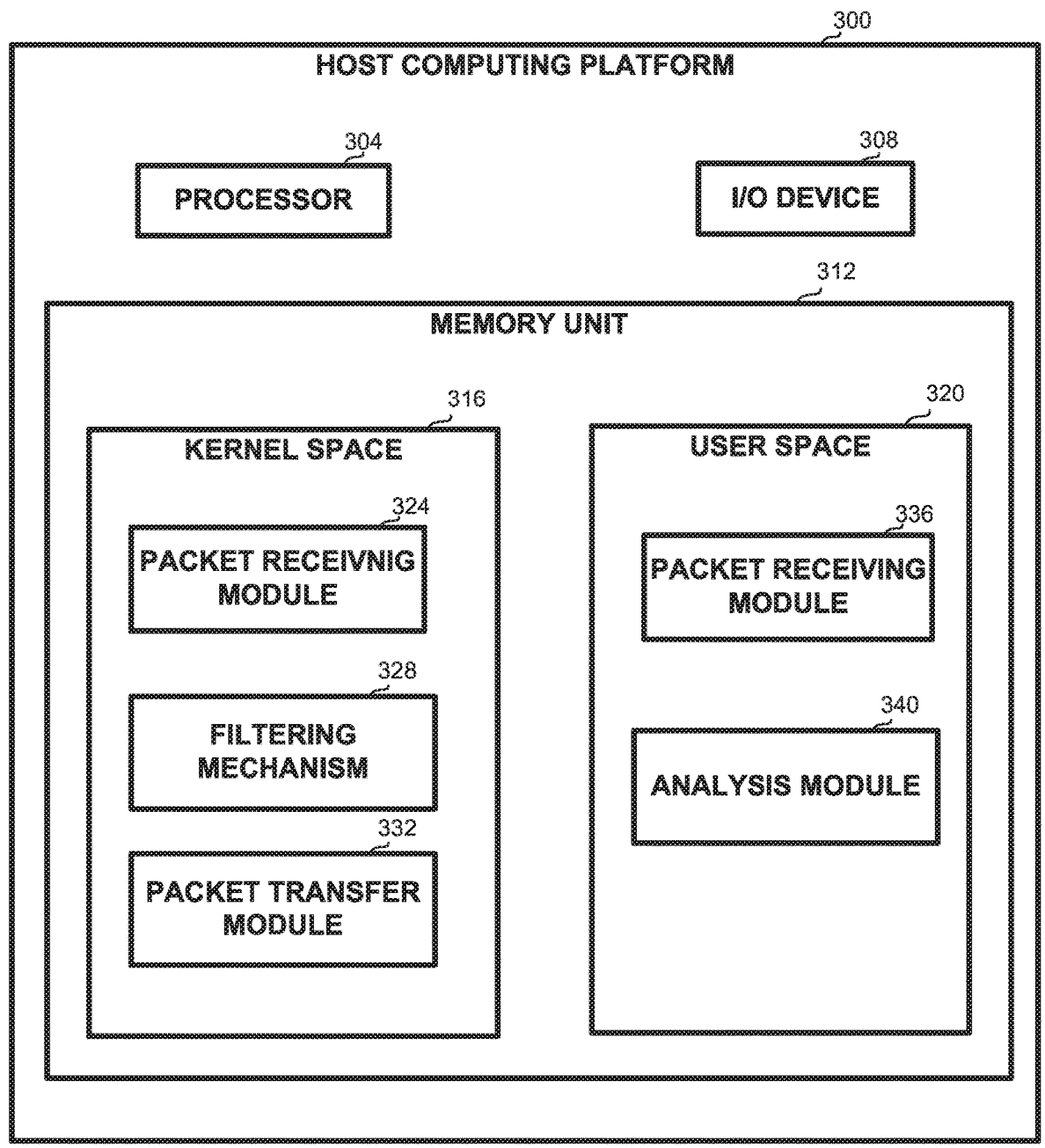
FIG. 3 shows a block diagram of a computing device configured for monitoring communications in a network, in accordance with some exemplary embodiments of the disclosed subject matter.

Referring now to FIG. 3, showing a block diagram of a computing platform, in accordance with some exemplary embodiments of the disclosed subject matter.

When TCP data arrives into or leaves a host computing platform, it passes from/to a hardware network interface controller into the kernel of the host and from the kernel to the designated user space application executed by the host. Application level data may be processed in the LINUX™ kernel by the network, and specifically to the TCP case, by the TCP/IP stack. Using BFP enables to intercept and filter packets according to a defined set of characteristics, and transfer a copy of only those packets that passed the filter from the kernel to user space monitoring application. This selective transfer provides for processing a small part of the arriving/leaving information, thus reducing the CPU, storage and networking overheads incurred by the monitoring. Passing packets from the kernel to/from user space may be inefficient and may require significant resources, thus using the BPF for kernel space filtering enables to obtain significant level of monitoring accuracy while reducing the overheads to an acceptable level. This is specifically true when the BPF filters the majority of the packets, hence most of the packets are never transferred to the user-space for monitoring purposes.

A Host Computing Platform 300 depicted in FIG. 3, may be configured to monitor communication in a network.

In some exemplary embodiments, Host Computing Platform 300 may comprise a Processor 304, which may be a Central Processing Unit (CPU), a microprocessor, an electronic circuit, an Integrated Circuit (IC) or the like. Processor 304 may be utilized to perform computations required by Host Computing Platform 300 or any of it subcomponents. Processor 304 may be configured to execute computer-programs useful in performing the method of FIGS. 2A and 2B.

In some exemplary embodiments, one or more I/O Devices 308 may be configured to receive input from and provide output to a user. I/O Devices 308 may comprise a keyboard, a pointing device such as a mouse or a touch screen, a display, or the like. In some exemplary embodiments, I/O Devices 308 may be utilized to enable a user define the ranges to be captured, to review analysis results, or the like.

In some exemplary embodiments, a Memory Unit 312 associated with Host Computing Platform 300 may be a short-term storage device or long-term storage device. Memory Unit 312 may be a persistent storage or volatile storage. Memory Unit 312 may be a disk drive, a Flash disk, a Random Access Memory (RAM), a memory chip, or the like. In some exemplary embodiments, Memory Unit 312 may retain program code operative to cause Processor 304 to perform acts associated with any of the subcomponents of Host Computing Platform 300. In some exemplary embodiments, Memory Unit 312 may retain program code operative to cause Processor 304 to perform acts associated with any of the steps shown in FIGS. 2A and 2B above. The components detailed below may be implemented as one or more sets of interrelated computer instructions, executed for example by Processor 304 or by another processor. The components may be arranged as one or more executable files, dynamic libraries, static libraries, methods, functions, services, or the like, programmed in any programming language and under any computing environment.

Memory Unit 312 can comprise Kernel Space 316 and User Space 320. In alternative embodiments, the memory areas indicated as kernel space 316 may be implemented memory areas of two or more computing platforms, and user space 320 may be implemented as memory area of one of the computing platforms, or yet a different computing platform.

Kernel Space 316 may comprise a memory space accessible only to the kernel of the operating system. Kernel Space 316 may be where the kernel executes and provides its services. In some exemplary embodiments, Kernel Space 316 is accessible only in kernel mode, which may be hardware-enforced. User Space 320, on the other hand, may be a set of memory locations accessible to non-kernel processes, and in which user processes execute.

Kernel Space 316 can retain a Packet Receiving Module 324 for receiving one or more packets incoming to Host Comporting Platform 300 or leaving Host Comporting Platform 300.

Kernel Space 316 can retain Filtering Mechanism 328, such as BFP, for examining the received packets and determining which packets should be provided to User Space 320. Filtering Mechanism 328 may be designed to apply a filter that is retained in User Space 320, and apply it while executing in Kernel Space 316.

Kernel Space 316 can retain Packet Transfer Module 332 for capturing a packet and transferring the packet to User Space 320.

User Space 320 can retain a Packet Receiving Module 336 for receiving a packet transferred from Kernel Space 316 for analysis.

User Space 320 can retain an Analysis Module 344 for performing analyses, such as determining a session volume as detailed for example on FIG. 2B above, and optionally further analyses. Analysis may use, for example, time stamps associated with packets. The analyses may include the session duration; average bandwidth during the session; changes in bandwidth along the session, or the like.

It will be appreciated that although the description is focused on TCP flows s passing between hosts installed with LINUX™ operating system, this disclosure is not limited to such configuration and may be applied also to other operating systems, distributed systems, to devices that are not hosts, and to other protocols, having any counter indicating a wraparound.

It will be appreciated that the disclosure can be implemented with more than two ranges, for example three, four or any number of ranges. However, for at least two ranges, minimal distance needs to exist between the end of one range and the beginning of the other, and vice versa, such that one of these distances will be through a wraparound.

As used herein, "about" or "approximately" shall generally mean within 20 percent, within 10 percent, and preferably within 5 percent of a given value or range. Numerical quantities given herein are approximate, meaning that the term "about" or "approximately" can be inferred if not expressly stated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of monitoring a communication network, comprising:
   in response to receiving a packet from a stream of packets transmitted to a computing platform, determining, based on a meta-data of the packet, whether to capture the packet or avoid capturing thereof, said determining comprising:
   subject to the meta-data indicating that a sequence number of the packet of a session is within a first range or within a second range, wherein a distance between an end of the first range and a beginning of the second range is at least of a predetermined size, and each of the first range and the second range are at least of a size of maximum packet size in the session or a size of a retransmission window for the session,
   wherein a distance, through a wraparound, between an end of the second range and a beginning of the first range is at least of the predetermined size, thereby a wraparound situation is identifiable within the stream of packets; and
   in response to determining to capture the packet:
   capturing the packet; and
   transmitting, to a user space of a memory of the computing platform, the packet to perform analysis.

2. The method of claim 1, wherein said determining is performed in a stateless manner.

3. The method of claim 1 further comprising analyzing the packet to determine a flow-level characteristic.

4. The method of claim 3, wherein the flow level characteristic is selected from the group consisting of: a volume transmitted during a session; a duration of the session; and an average bandwidth during the session.

5. The method of claim 1, wherein in response to the meta-data indicating that the packet is a synchronization (SYN) Transmission Control Protocol (TCP) packet, a reset (RST) TCP packet or a finish (FIN) TCP packet, determining to capture the packet.

6. The method of claim 1, wherein said determining is performed in a kernel space of the computing platform, and analysis of the packet is performed in the user space of the computing platform.

7. The method of claim 1, wherein a Berkeley Packet Filter (BPF) is utilized to determine if the meta-data indicates that the sequence number is within the first range or within the second range.

8. The method of claim 7, wherein the BPF is utilized to further determine if the meta-data indicates the packet is a beginning packet of a session or an ending packet of a session.

9. The method of claim 1, wherein the size is equal to the maximum packet size.

10. The method of claim 9, wherein the size being at least the retransmission window, wherein the retransmission window is a TCP window size.

11. The method of claim 1, further comprising transmitting the packet to analysis in response to the meta-data indicating that the packet is not a TCP packet.

12. The method of claim 1, wherein said stream of packets is examined until a stopping condition is determined, the stopping condition is selected from the group consisting of: a predetermined period of time has elapsed; a predetermined number of packets has been captured; a predetermined number of TCP packets has been captured; a predetermined number of TCP sessions has been initialized or terminated; and a predetermined number of wraparounds has been observed.

13. A system having a processor, the processor being adapted to perform the steps of:
   in response to receiving a packet from a stream of packets transmitted to a computing platform, determining, based on a meta-data of the packet, whether to capture the packet or avoid capturing thereof, said determining comprising:
   subject to the meta-data indicating that a sequence number of the packet of a session is within a first range or within a second range, wherein a distance between an end of the first range and a beginning of the second range is at least of a predetermined size, and each of the first range and the second range are at least of a size of maximum packet size in the session or a size of a retransmission window for the session,
   wherein a distance, through a wraparound, between an end of the second range and a beginning of the first range is at least of the predetermined size, thereby a wraparound situation is identifiable within the stream of packets; and
   in response to determining to capture the packet:
   capturing the packet; and
   transmitting, to a user space of a memory of the computing platform, the packet to perform analysis.

14. The system of claim 13, wherein said determining is performed in a stateless manner.

15. The system of claim 13, wherein the packet is analyzed to determine a flow-level characteristic, selected from the group consisting of: a volume transmitted during a session; a duration of the session; and an average bandwidth during the session.

16. The system of claim 13, wherein in response to the meta-data indicating that the packet is a synchronization (SYN) TCP packet, a reset (RST) TCP packet, a finish (FIN) TCP packet, or not a TCP packet, the processor determines to capture the packet.

17. The system of claim 13, wherein a Berkeley Packet Filter (BPF) is utilized to determine if the meta-data indicates that the sequence number is within the first range or within the second range, and wherein the BPF is utilized to further determine if the meta-data indicates the packet is a beginning packet of a session or an ending packet of a session.

18. The system of claim 13, wherein the size being at least the retransmission window, wherein the retransmission window is a TCP window size.

19. The system of claim 13, wherein said stream of packets is examined until a stopping condition is determined, the stopping condition is selected from the group consisting of: a predetermined period of time has elapsed; a predetermined number of packets has been captured; a predetermined number of TCP packets has been captured; a predetermined number of TCP sessions has been initialized or terminated; and a predetermined number of wraparounds has been observed.

20. A non-transitory computer readable medium retaining program instructions, the instructions when read by a processor, cause the processor to perform a method comprising:
   in response to receiving a packet from a stream of packets transmitted to a computing platform, determining, based on a meta-data of the packet of a session, whether to capture the packet or avoid capturing thereof, said determining comprising:

subject to the meta-data indicating that a sequence number of the packet is within a first range or within a second range, wherein a distance between an end of the first range and a beginning of the second range is at least of a predetermined size, and each of the first range and the second range are at least of a size of maximum packet size in the session or a size of a retransmission window for the session, wherein a distance, through a wraparound, between an end of the second range and a beginning of the first range is at least of the predetermined size, thereby a wraparound situation is identifiable within the stream of packets; and in response to determining to capture the packet:

capturing the packet; and transmitting, to a user space of a memory of the computing platform, the packet to perform analysis.

* * * * *